（12） United States Patent
Kawakami et al.

(10) Patent No.: US 11,936,062 B2
(45) Date of Patent: Mar. 19, 2024

(54) BATTERY PACK

(71) Applicant: SANYO Electric Co., Ltd., Osaka (JP)

(72) Inventors: Satoshi Kawakami, Hyogo (JP); Masaya Nakano, Osaka (JP)

(73) Assignee: PANASONIC ENERGY CO., LTD., Osaka (JP)

( * ) Notice: Subject to any disclaimer, the term of this patent is extended or adjusted under 35 U.S.C. 154(b) by 465 days.

(21) Appl. No.: 17/311,711

(22) PCT Filed: Dec. 2, 2019

(86) PCT No.: PCT/JP2019/047083
§ 371 (c)(1),
(2) Date: Jun. 8, 2021

(87) PCT Pub. No.: WO2020/129596
PCT Pub. Date: Jun. 25, 2020

(65) Prior Publication Data
US 2022/0029240 A1    Jan. 27, 2022

(30) Foreign Application Priority Data
Dec. 21, 2018 (JP) ................................. 2018-240083

(51) Int. Cl.
*H01M 50/367* (2021.01)
*H01M 50/213* (2021.01)
*H01M 50/227* (2021.01)
*H01M 50/231* (2021.01)
*H01M 50/262* (2021.01)

(52) U.S. Cl.
CPC ....... *H01M 50/367* (2021.01); *H01M 50/213* (2021.01); *H01M 50/227* (2021.01); *H01M 50/231* (2021.01); *H01M 50/262* (2021.01)

(58) Field of Classification Search
None
See application file for complete search history.

(56) References Cited

U.S. PATENT DOCUMENTS

2010/0183910 A1    7/2010  Nishino et al.

FOREIGN PATENT DOCUMENTS

| EP | 1030388 A1 | 8/2000 |
|---|---|---|
| JP | 2001-084974 | 3/2001 |
| JP | 2009-021223 | 1/2009 |
| JP | 2010-055957 A | 3/2010 |
| WO | 2017/110037 A1 | 6/2017 |

OTHER PUBLICATIONS

English Translation of Chinese Office Action dated Oct. 19, 2022 for the related Chinese Patent Application No. 201980083102.5.
International Search Report of PCT application No. PCT/JP2019/047083 dated Feb. 4, 2020.
The Extended European Search Report dated Feb. 18, 2022, issued in counterpart EP Application No. 19901314.5. (7 pages).

*Primary Examiner* — Lucas J. O'Donnell
(74) *Attorney, Agent, or Firm* — WHDA, LLP (57) ABSTRACT

A battery pack includes battery cell having exhaust valve that opens when internal pressure exceeds set pressure, and case that houses battery cell. Case includes multiple case units molded with plastic, multiple case units being coupled with mating surfaces to dispose battery cell inside case, and heat-resistant material disposed inside mating surfaces of respective multiple case units, heat-resistant material blocking gap between mating surfaces.

10 Claims, 9 Drawing Sheets

BATTERY PACK

CROSS-REFERENCE TO RELATED APPLICATIONS

This application is a U.S. national stage application of the PCT International Application No. PCT/JP2019/047083 filed on Dec. 2, 2019, which claims the benefit of foreign priority of Japanese patent application No. 2018-240083 filed on Dec. 21, 2018, the contents all of which are incorporated herein by reference.

TECHNICAL FIELD

The present invention relates to a battery pack in which a chargeable battery is housed in an exterior case.

BACKGROUND ART

In recent years, a battery pack used as a power source of a portable electric device has been further required to have high output, and a non-aqueous electrolyte secondary battery such as a lithium ion battery having excellent efficiency per unit volume has been used. Although the lithium ion battery has high output, it has internal pressure that may increase for some reason. To ensure safety against an increase in internal pressure of the battery, an exhaust valve that is opened at a set pressure to prevent rupture is provided. When the exhaust valve is opened, the battery is in an abnormal heat generation state, and thus a high-temperature gas is vigorously ejected from the exhaust valve. To protect a battery from exhaust gas at high temperature, a battery pack has been developed in which a heat-resistant material is disposed on an inner surface of a case (refer to PTL 1).

There has been also developed a battery pack in which a mating surface of a case has a labyrinth structure to allow exhaust gas to flow to the outside (refer to PTL 2).

CITATION LIST

Patent Literature

PTL 1: Unexamined Japanese Patent Publication No. 2009-21223
PTL 2: Unexamined Japanese Patent Publication No. 2001-084974

SUMMARY OF THE INVENTION

The battery packs of PTLs 1 and 2 are less likely to suppress a defect in that exhaust gas is ejected from a mating surface of an exterior case. The mating surface of the case has a gap, so that exhaust gas is easily discharged from the gap. This causes a problem in that gas at high temperature is ejected from the mating surface. In particular, a case made of plastic has a disadvantage in that when exhaust gas at high temperature passes through a gap in a mating surface, the plastic is thermally melted to increase the gap, and then exhaust gas at high temperature is vigorously ejected. The exhaust gas is vigorously ejected from the exhaust valve of the lithium ion battery, which is a non-aqueous electrolyte secondary battery, at an abnormally high temperature of 400° C. or higher. Thus, when the gas passes through the mating surface and is discharged to the outside, the gas may cause smoking, ignition, or the like outside the case, and safety cannot be secured.

The present invention is made based on such findings. It is a main object of the present invention to provide a battery pack that can ensure safety by suppressing adverse effect in which exhaust gas at high temperature ejected from an exhaust valve of a battery is ejected to the outside through a mating surface of a case.

A battery pack of the present invention includes battery cell 2 having exhaust valve 2a that opens when internal pressure exceeds set pressure, and case 1 that houses battery cell 2. Case 1 includes multiple case units 10 molded with plastic, multiple case units 10 being coupled with mating surfaces 4 to dispose battery cell 2 inside case 1, and heat-resistant material 3 disposed inside mating surfaces 4 of respective multiple case units 10, heat-resistant material 3 blocking gap 5 between mating surfaces 4.

The battery pack of the present invention has an advantage in that safety can be ensured by suppressing adverse effect in which exhaust gas at high temperature ejected from the exhaust valve of the battery is ejected to the outside through the mating surface of the case. This is because the case of the battery pack of the present invention includes the heat-resistant material disposed inside the mating surfaces of the multiple case units molded with plastic, the heat-resistant material blocking the gap between the mating surfaces. The battery pack in which the gap between the mating surfaces of the case units is blocked by the heat-resistant material as described above enables the heat-resistant material disposed in a portion inside the mating surfaces of the case to effectively prevent flame and the like from passing through this portion, and effectively prevent exhaust gas at high temperature and the flame from being vigorously ejected to the outside of the case, even when the battery cell is in an abnormal state and exhaust gas at high temperature is ejected to the mating surfaces of the case.

DESCRIPTION OF EMBODIMENTS

A first aspect of the present invention is a battery pack including: a battery cell having an exhaust valve that opens when internal pressure exceeds set pressure; a case that houses the battery cell, the case including multiple case units molded with plastic, the multiple case units being coupled using mating surfaces to dispose the battery cell inside the case; and a heat-resistant material disposed inside the mating surfaces of respective multiple case units, the heat-resistant material blocking a gap between the mating surfaces.

The battery pack described above blocks the gap between the mating surfaces using the heat-resistant material disposed inside the mating surfaces of the respective case units coupled to each other. Thus, even when the battery cell is in an abnormal state and exhaust gas at high temperature is ejected to the mating surfaces of the case, the heat-resistant material disposed in a portion inside each of the mating surfaces of the case can effectively prevent flame and the like from passing through this portion, and can effectively prevent exhaust gas at high temperature and the flame from being vigorously ejected to the outside of the case.

A second aspect of the present invention is configured such that in the first aspect, the heat-resistant material is sandwiched between the mating surfaces of the respective case units to block the gap between the mating surfaces.

This structure with the heat-resistant material sandwiched between the mating surfaces of the case units enables the mating surfaces of the case units to be brought close to the heat-resistant material to reliably block the gap between the mating surfaces, so that exhaust gas at high temperature ejected from the battery cell, flame, and the like can be effectively prevented from passing through the gap and being ejected to the outside of the case.

A third aspect of the present invention is configured such that in the first aspect or the second aspect of the present invention, the case units have the respective mating surface that is each provided with a coupling groove, and the heat-resistant material is guided to the coupling groove to block the gap between the mating surfaces.

This structure allows the heat-resistant material to be guided to the coupling groove provided in the mating surface, so that the heat-resistant material can be disposed at a fixed position while being positioned. The heat-resistant material is guided to the coupling groove provided in the mating surface, so that passage of exhaust gas, flame, and the like can be effectively prevented by increasing an area of the heat-resistant material disposed inside the mating surface.

A fourth aspect of the present invention is configured such that in any one of the first to third aspects of the present invention, the mating surfaces of the case units have stepped shapes that are allowed to be fitted to each other, the stepped shapes each being formed by providing a fitting ridge and a fitting recess on front and back surfaces of the corresponding one of the case units, and the heat-resistant material is sandwiched between the fitting protrusions of the pair of case units coupled with the mating surfaces.

This structure provides a step structure in which the case units are fitted to each other, the case units each including the fitting ridge and the fitting recess on the front and back surfaces, so that the heat-resistant material can be disposed inside the mating surfaces coupled to each other while the mating surfaces are simplified in shape.

A fifth aspect of the present invention is configured such that in any one of the first to fourth aspects of the present invention, the heat-resistant material is disposed at a position facing an opening of the exhaust valve.

This structure allows the heat-resistant material to be disposed at the position facing the exhaust valve of the battery cell, so that passage of exhaust gas at high temperature or flame ejected from the battery cell can be effectively prevented.

A sixth aspect of the present invention is configured such that in any one of the first to fifth aspects of the present invention, the heat-resistant material is an aggregate sheet of heat-resistant fiber.

This structure allows the heat-resistant material to be composed of the aggregate sheet of heat-resistant fiber, so that the heat-resistant material can be ideally disposed in a narrow gap formed inside the mating surface while being thinned and being made flexible.

A seventh aspect of the present invention is configured such that in the sixth aspect, the heat-resistant fiber is inorganic fiber.

This structure allows inorganic fiber to be used as the heat-resistant fiber constituting the heat-resistant material, so that excellent flame retardancy and fire retardant properties can be achieved.

An eighth aspect of the present invention is configured such that in the sixth or seventh aspect, the heat-resistant material is a molded heat-resistant sheet in which a molded plastic and the aggregate sheet are coupled forming an integrated structure.

This structure allows the heat-resistant material to be formed of a molded heat-resistant sheet in which the aggregate sheet composed of heat-resistant fiber and the molded plastic are coupled forming the integrated structure, so that the heat-resistant material can be simply and easily molded into a specific shape.

A ninth aspect of the present invention is configured such that in the eighth aspect, the heat-resistant material is a molded heat-resistant sheet in which plastics are coupled to both surfaces of the aggregate sheet, forming an integrated structure.

This structure allows both surfaces of the molded heat-resistant sheet to be molded surfaces of plastic, so that the heat-resistant material can be easily handled and an assembly process of the battery pack can be efficiently performed.

A tenth aspect of the present invention is configured such that in the eighth or ninth aspect, the heat-resistant material is a molded heat-resistant sheet molded into a shape disposed between the mating surfaces of the respective case units.

This structure allows the molded heat-resistant sheet to be molded into the shape disposed between the mating surfaces of the respective case units, and thus achieving an advantage of enabling a smooth assembly process of the battery pack and efficient mass production of the battery pack.

Hereinafter, the present invention will be described in detail with reference to the drawings. Although in the following description, terms indicating a specific direction or position (e.g., "top", "bottom", and other terms including those terms) are used as necessary, those terms are used to facilitate understanding of the invention with reference to the drawings, and thus meanings of the terms do not limit the technical scope of the invention. Portions having the same reference numerals appearing in a plurality of drawings indicate the same or equivalent portions or members.

Exemplary embodiments described below are specific examples of the technical idea of the present invention, and thus do not limit the present invention. Dimensions, materials, shapes, relative placement, and the like of components described below are not intended to limit the scope of the present invention to only those, and are merely intended to show explanatory examples unless otherwise specified. Contents described in one exemplary embodiment and example can be applied to other exemplary embodiments and examples. To clarify description, sizes and a positional relationship of members illustrated in the drawings may be exaggerated.

First Exemplary Embodiment

Figure 1:
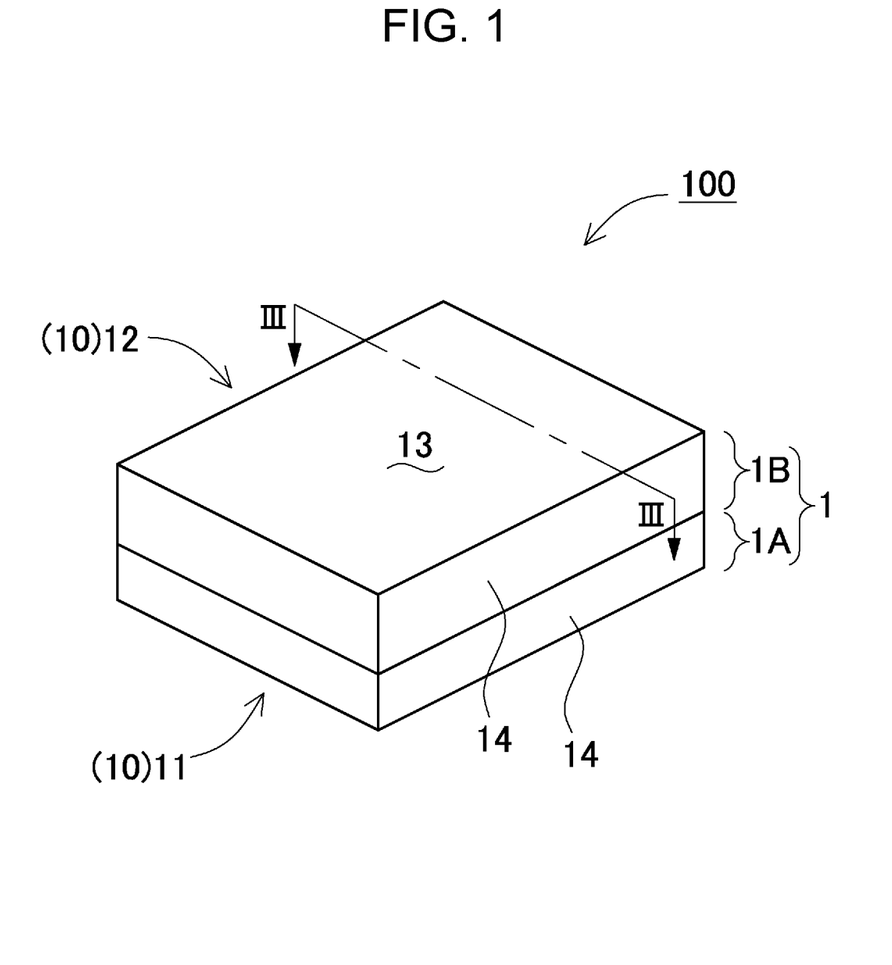
FIG. 1 is a perspective view of a battery pack according to a first exemplary embodiment of the present invention.
Figure 2:
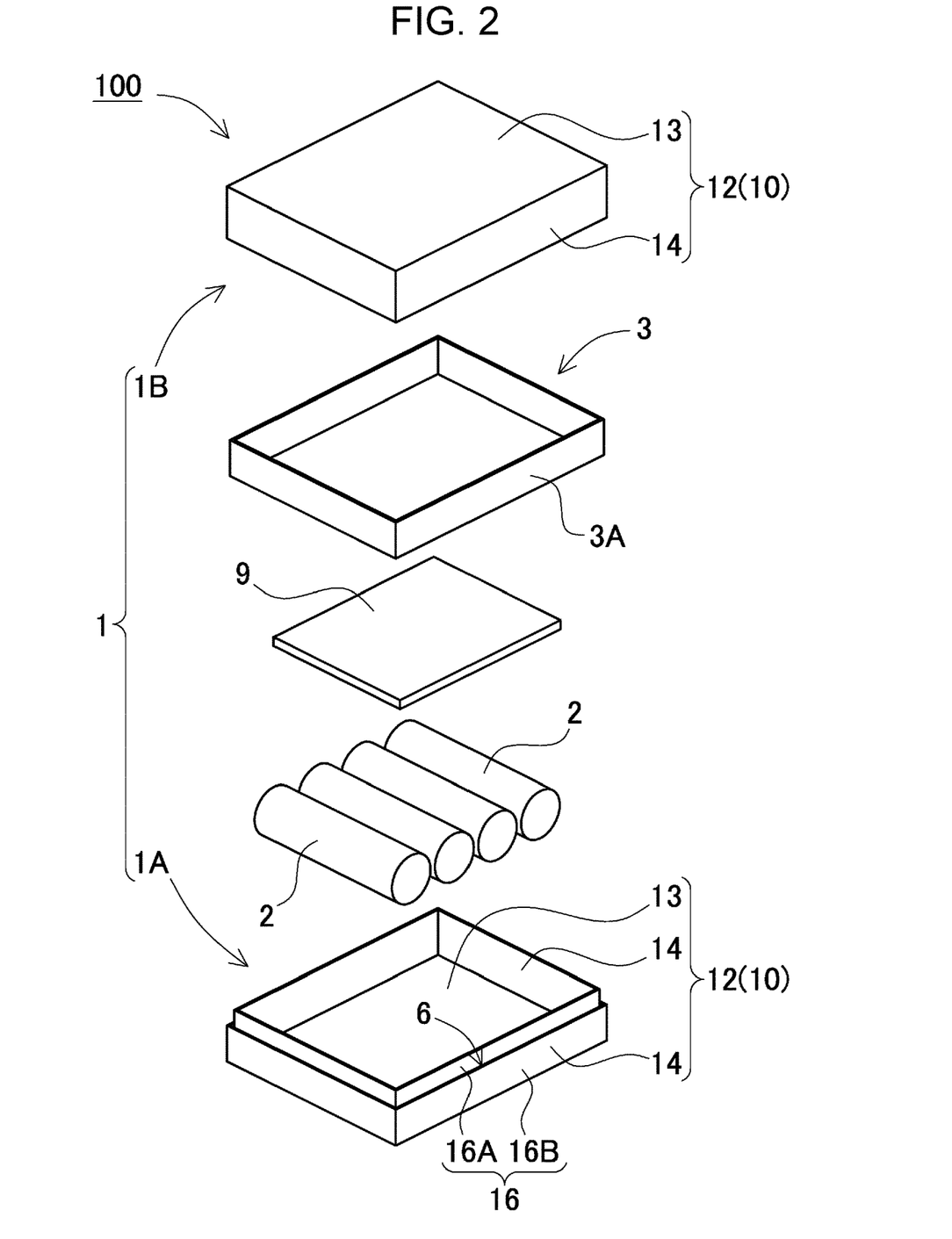
FIG. 2 is an exploded perspective view of the battery pack illustrated in FIG. 1.
Figure 3:
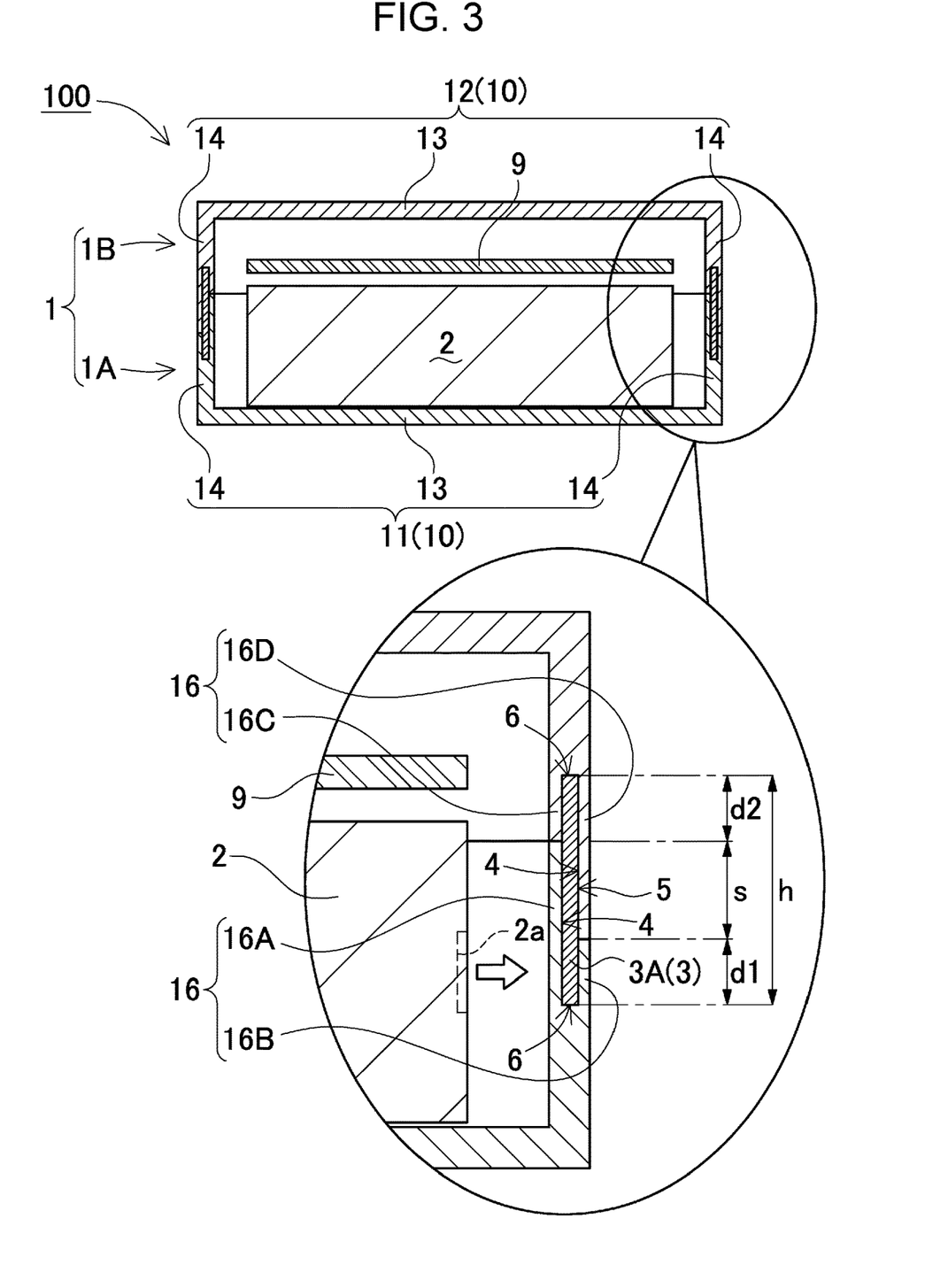
FIG. 3 is a partially enlarged sectional view taken along line III-III of the battery pack illustrated in FIG. 1.
Figure 4:
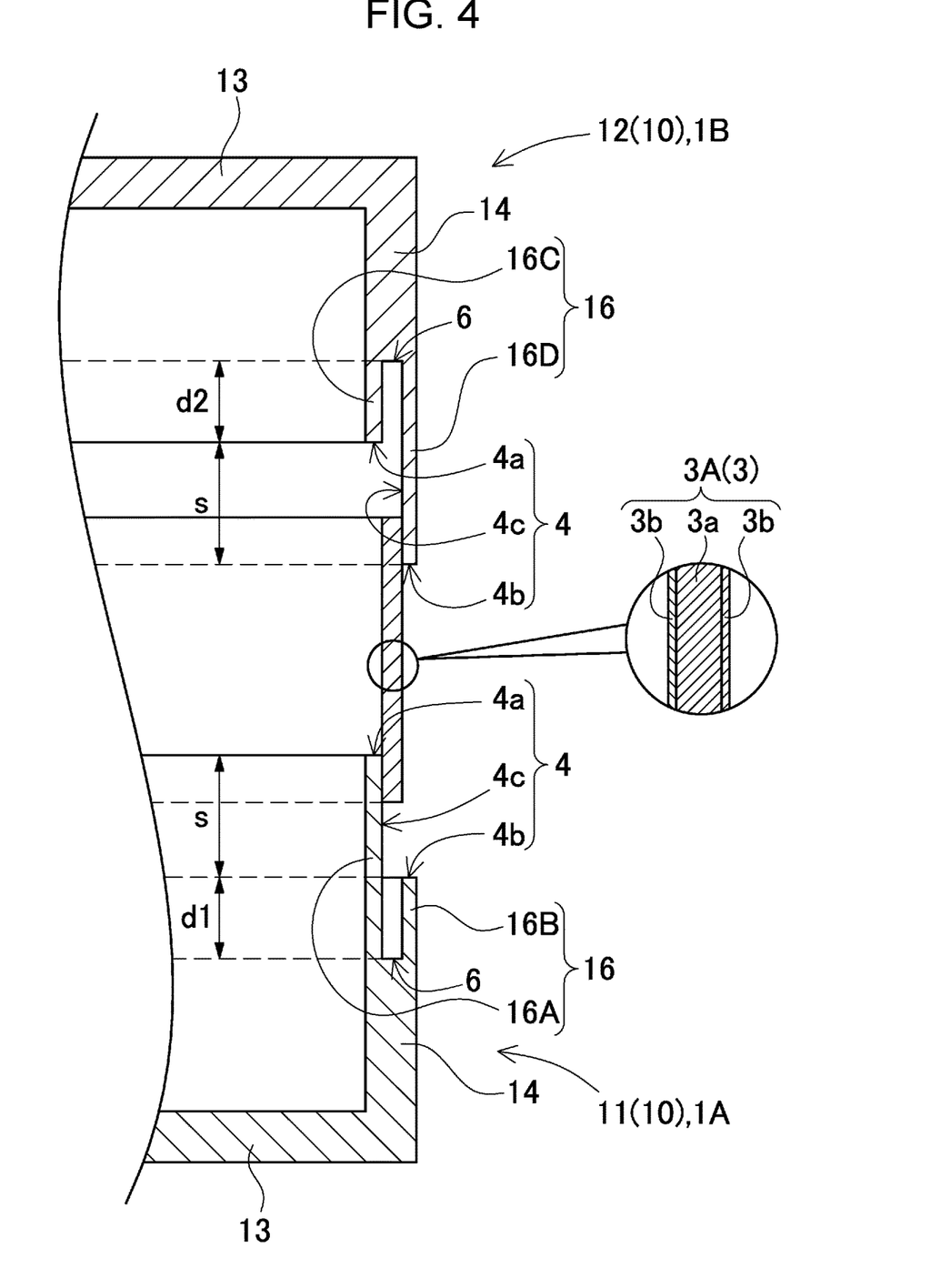
FIG. 4 is an enlarged exploded sectional view of a main part of the battery pack illustrated in FIG. 3.

FIGS. 1 to 4 each illustrate a battery pack according to a first exemplary embodiment of the present invention. In these drawings, FIG. 1 is a perspective view of a battery pack, FIG. 2 is an exploded perspective view of the battery pack of FIG. 1, FIG. 3 is a partially enlarged sectional view taken along line III-III of the battery pack of FIG. 1, and FIG. 4 is an enlarged exploded sectional view of a main part of the battery pack of FIG. 3. Battery pack 100 illustrated in these drawings includes battery cell 2 and case 1 that houses battery cell 2. Case 1 includes multiple case units 10 molded of plastic. Multiple case units 10 are coupled between mating surfaces 4, and battery cell 2 is disposed inside case units 10. Case units 10 include heat-resistant material 3 disposed inside mating surfaces 4, and gap 5 between mating surfaces 4 is blocked by heat-resistant material 3.

(Battery Cell 2)

Battery cell 2 is a lithium ion secondary battery that can be charged and discharged. The lithium ion secondary battery has a large charge and discharge capacity by capacity and weight, so that battery pack 100 can be increased in charge and discharge capacity while being reduced in size of its outer shape and in weight. The battery pack of the present invention, however, can use all other rechargeable secondary batteries instead of the lithium ion secondary battery.

Battery cell 2 is configured such that an electrode body is housed in an exterior can with a bottom in a cylindrical shape, and the exterior can is filled with an electrolytic solution and has an opening blocked with a sealing plate. Battery cell 2 illustrated in FIG. 2 is a cylindrical battery having an exterior can and a cylindrical shape. Although not illustrated, battery cell 2 being a cylindrical battery includes protruded electrodes provided in respective central portions of a bottom surface of the exterior can and the sealing plate that are opposite end surfaces of battery cell 2, the protruded electrodes serving as positive and negative electrode terminals. However, battery cell 2 is not limited to a cylindrical battery, and may be a rectangular battery or a flat battery.

Battery cell 2 further includes exhaust valve 2a that opens when internal pressure exceeds set pressure. Although not illustrated, battery cell 2 in a cylindrical shape includes exhaust valve 2a provided in the sealing plate provided with the corresponding one of the protruded electrodes. Battery cell 2 ensures safety such that when internal pressure of the battery increases due to overcharge, internal short circuit, or the like, exhaust valve 2a is opened to discharge internal gas to the outside. However, when an abnormality occurs and battery cell 2 is further overheated, gas at high temperature may be ejected from the inside or may be ejected as a burning flame. In such a case, battery cell 2 is likely to be in a state in which ejection such as gas at high temperature or flame is ejected from a surface provided with exhaust valve 2a. The battery pack of the present invention is configured such that heat-resistant material 3 is disposed inside mating surface 4 of case 1 to suppress passage of gas at high temperature, thereby suppressing ejection of exhaust gas at high temperature to the outside of case 1 even when an abnormality occurs in some of battery cells 2 and exhaust gas at high temperature is ejected from exhaust valve 2a.

Battery pack 100 illustrated in FIG. 2 includes four cylindrical batteries that are arranged parallel to each other on the same plane and housed in case 1. Multiple battery cells 2 are stored in a horizontal attitude in the drawing. Battery pack 100 can be adjusted for charge and discharge capacity by a number of battery cells 2 housed in case 1. Thus, battery pack 100 houses the number of battery cells 2 having an optimum capacity for intended use.

(Case 1)

Case 1 includes multiple case units 10 molded of plastic. Case unit 10 is molded of plastic of thermoplastic resin that is an insulating material. Case unit 10 can be preferably made of plastic excellent in flame retardancy. As this kind of plastic, for example, polycarbonate (PC) or polypropylene (PP) can be used. Multiple case units 10 has a structure in which they are coupled between mating surfaces 4 facing each other to house battery cells 2 inside.

Case 1 illustrated in FIGS. 1 to 4 is composed of two case units 10 including first case unit 11 and second case unit 12. Case units 10 each have a bottomed box shape, and are configured to be coupled at opening edges facing each other to house multiple battery cells 2 inside.

(First Case Unit 11, Second Case Unit 12)

First case unit 11 is lower case 1A of case 1 divided into two vertically, and is formed in a box shape with an upper opening. First case unit 11 includes peripheral walls 14 along the periphery of surface plate 13 serving as a bottom plate, and mating surface 4 is provided at a leading end portion of each peripheral wall 14. Second case unit 12 is upper case 1B of case 1 divided into two vertically, and is formed in a box shape with a lower opening. Second case unit 12 includes peripheral walls 14 along the periphery of surface plate 13 serving as a top plate and being molded integrally, and mating surface 4 is provided at a leading end portion of each peripheral wall 14.

Case 1 further has a structure in which heat-resistant material 3 described later is disposed inside mating surfaces 4 coupled to each other. Case 1 illustrated in FIGS. 3 and 4 is configured such that gap 5 in a hollow shape is formed between mating surfaces 4 facing each other in a state where case units 10 facing each other are coupled with mating surfaces 4 facing each other. Case 1 is configured such that heat-resistant material 3 is disposed inside mating surfaces 4 by interposing heat-resistant material 3 in gap 5 formed between mating surfaces 4. Thus, in the present specification, the term, "inside mating surfaces 4", means gap 5 in a hollow shape formed between mating surfaces 4 disposed facing each other.

Each case unit 10 illustrated in FIGS. 2 to 4 includes coupling groove 6 extending along an opening edge of peripheral wall 14 in a leading end surface of peripheral wall 14 to form gap 5 in a hollow shape between mating surfaces 4 in a state where mating surfaces 4 facing each other are coupled to each other. Case units 10 illustrated in FIG. 2 are provided with coupling grooves 6 along four sides of respective case units 10 having a quadrangular shape in plan view. Case units 10 are each configured such that coupling grooves 6 are each formed having an opening width substantially equal to or slightly larger than a thickness of heat-resistant material 3 to enable heat-resistant material 3 to be disposed inside corresponding one of coupling grooves 6.

Each case unit 10 illustrated in FIGS. 2 to 4 is configured such that height difference s is provided in vertical walls 16 formed on both sides of coupling groove 6 to increase height h of gap 5 formed between mating surfaces 4 facing each other. Each case unit 10 illustrated in FIGS. 3 and 4 is configured such that vertical walls 16 having height difference s are provided on an inner peripheral side and an outer peripheral side of the leading end surface of peripheral wall 14, and coupling groove 6 is provided between the pair of vertical walls 16. Case units 10 in each drawing is configured such that vertical walls 16 formed on both sides of respective coupling grooves 6 include first vertical walls 16A, 16C formed on an inner peripheral surface side of respective peripheral walls 14, and second vertical walls 16B, 16D formed on an outer peripheral surface side, height differences s being provided between first vertical walls 16A, 16C and corresponding second vertical walls 16B, 16D, and vertical walls 16 different in height face each other in leading end surfaces facing each other of respective vertical walls 16.

Specifically, first case unit 11 illustrated in FIGS. 3 and 4 includes first vertical wall 16A that is formed on the inner peripheral surface side of peripheral wall 14 and is higher than second vertical wall 16B formed on the outer peripheral surface side thereof. Second case unit 12 includes first vertical wall 16C that is formed on the inner peripheral surface side of peripheral wall 14 and is lower than second vertical wall 16D formed on the outer peripheral surface side thereof. Height difference s between the pair of vertical walls 16 in first case unit 11 is equal to height difference s between the pair of vertical walls 16 in second case unit 12, so that leading end surfaces of second vertical walls 16B, 16D are coupled to each other while leading end surfaces of first vertical walls 16A, 16C are coupled to each other. Case units 10 having this structure include gap 5 formed between mating surfaces 4 of first case unit 11 and second case unit 12, gap 5 having height h obtained by adding height difference s between the pair of vertical walls 16 in first case unit 11 and second case unit 12 to the sum of depths d1, d2 of coupling grooves 6 formed in the leading end surfaces of peripheral walls 14 of first case unit 11 and second case unit 12. That is, h=d1+s+d2 is satisfied. This structure enables increasing height h of heat-resistant material 3 disposed inside mating surfaces 4, so that passage of exhaust gas at high temperature, flame, or the like passing through gap 5 of mating surfaces 4 can be effectively prevented, and thus the exhaust gas at high temperature, the flame, or the like can be effectively prevented from being ejected to the outside of case 1.

FIG. 4 illustrates a state in which upper and lower end portions of heat-resistant material 3 formed in a sheet shape are guided to respective coupling grooves 6 formed in mating surfaces 4 of case units 10, and heat-resistant material 3 is sandwiched between mating surfaces 4 facing each other to block gap 5 between mating surfaces 4. Case 1 described above is configured such that while the lower end portion of heat-resistant material 3 is inserted into coupling groove 6 of first case unit 11, the upper end portion of heat-resistant material 3 is guided to coupling groove 6 of second case unit 12, and heat-resistant material 3 is disposed between mating surfaces 4 facing each other. In this state, first case unit 11 and second case unit 12 are coupled to each other with mating surfaces 4 in close contact with each other. Lower case 1A being first case unit 11 and upper case 1B being second case unit 12 are coupled to each other by ultrasonic welding, for example. As illustrated in FIG. 4, first case unit 11 and second case unit 12 are ultrasonically welded while the leading end surfaces of first vertical walls 16A, 16C, serving as first mating surfaces 4a, are brought into close contact with each other, and the leading end surfaces of the second vertical walls 16B, 16D, serving as second mating surfaces 4b, are brought into close contact with each other. In this state, heat-resistant material 3 disposed inside mating surfaces 4 is sandwiched between an outer surface of first vertical wall 16A and an inner surface of second vertical wall 16D, the outer and inner surfaces facing each other and serving as third mating surfaces 4c, and gap 5 is blocked.

Case units 10 illustrated in FIGS. 3 and 4 are configured such that the pair of vertical walls 16 formed on peripheral wall 14 of first case unit 11 serving as lower case 1A include first vertical wall 16A formed on the inner peripheral surface side of the leading end surface, first vertical wall 16A having a higher height than second vertical wall 16B formed on the outer peripheral surface side of the leading end surface. As illustrated in FIG. 2, case units 10 having this structure have an advantage in that in the step of assembling battery pack 100, while battery cell 2 is housed in lower case 1A, heat-resistant material 3 formed in a frame shape can be disposed along an outer peripheral surface of first vertical wall 16A having a high height and located on an inner peripheral surface side of lower case 1A, and thus even heat-resistant material 3 having a high height can be disposed smoothly. As illustrated in FIG. 3, when first vertical wall 16A of lower case 1A is increased in height, a position of a joint surface with first vertical wall 16C of upper case 1B can be increased in height. Thus, the structure in which battery cell 2 is disposed at a bottom of case 1 enables a joint surface between first vertical walls 16A, 16C to be disposed at a position separated upward from an ejection position at which exhaust gas at high temperature or the like is ejected from an end surface of battery cell 2 as indicated by the arrow in FIG. 3. This enables a passage path of exhaust gas at high temperature or the like ejected from exhaust valve 2a of battery cell 2 to be lengthened, and this also brings an advantage in that adverse effect due to exhaust gas at high temperature passing through mating surfaces 4 can be reduced.

The case units may be configured such that the second vertical wall formed on the outer peripheral surface side of the peripheral wall of the first case unit serving as the lower case has a higher height than the first vertical wall formed on the inner peripheral surface side thereof. In this case, the second case unit serving as the upper case is configured such that the second vertical wall formed on the outer peripheral surface side of the peripheral wall is molded lower in height than the first vertical wall formed on the inner peripheral surface side thereof, and leading end surfaces of the vertical walls facing each other are coupled to each other while being in contact with each other.

Case units 10 described above are configured such that coupling grooves 6 are provided along four sides of case 1 having a quadrangular shape in plan view, and vertical walls 16 extended from respective coupling grooves 6 are provided on the leading end surfaces of corresponding peripheral walls 14. Case 1 having this shape enables heat-resistant material 3 to be disposed on entire mating surfaces 4 formed on the four sides of case 1 by disposed heat-resistant material 3 having a shape along four sides of each case unit 10.

However, the battery pack is not necessarily configured such that heat-resistant material 3 is disposed on mating surfaces 4 positioned on the four sides of case 1. For example, as illustrated in the plan view of FIG. 5, battery pack 200 in which battery cells 2 being multiple cylindrical batteries are arranged and stored parallel to each other in the same plane enables heat-resistant material 3 to be disposed only at a position facing an opening of exhaust valve 2a provided in each battery cell 2. The cylindrical batteries are each typically provided in its axial end surface with exhaust valve 2a, so that battery pack 200 illustrated in the drawing includes heat-resistant material 3 that is disposed only on peripheral walls 14 located on respective surfaces facing both end surfaces of each cylindrical battery. Thus, case unit 10 has a structure in which coupling groove 6 is provided only in each of peripheral walls 14 facing both respective end surfaces of the cylindrical battery, and heat-resistant material 3 having a flat plate shape is disposed in coupling groove 6.

Figure 5:
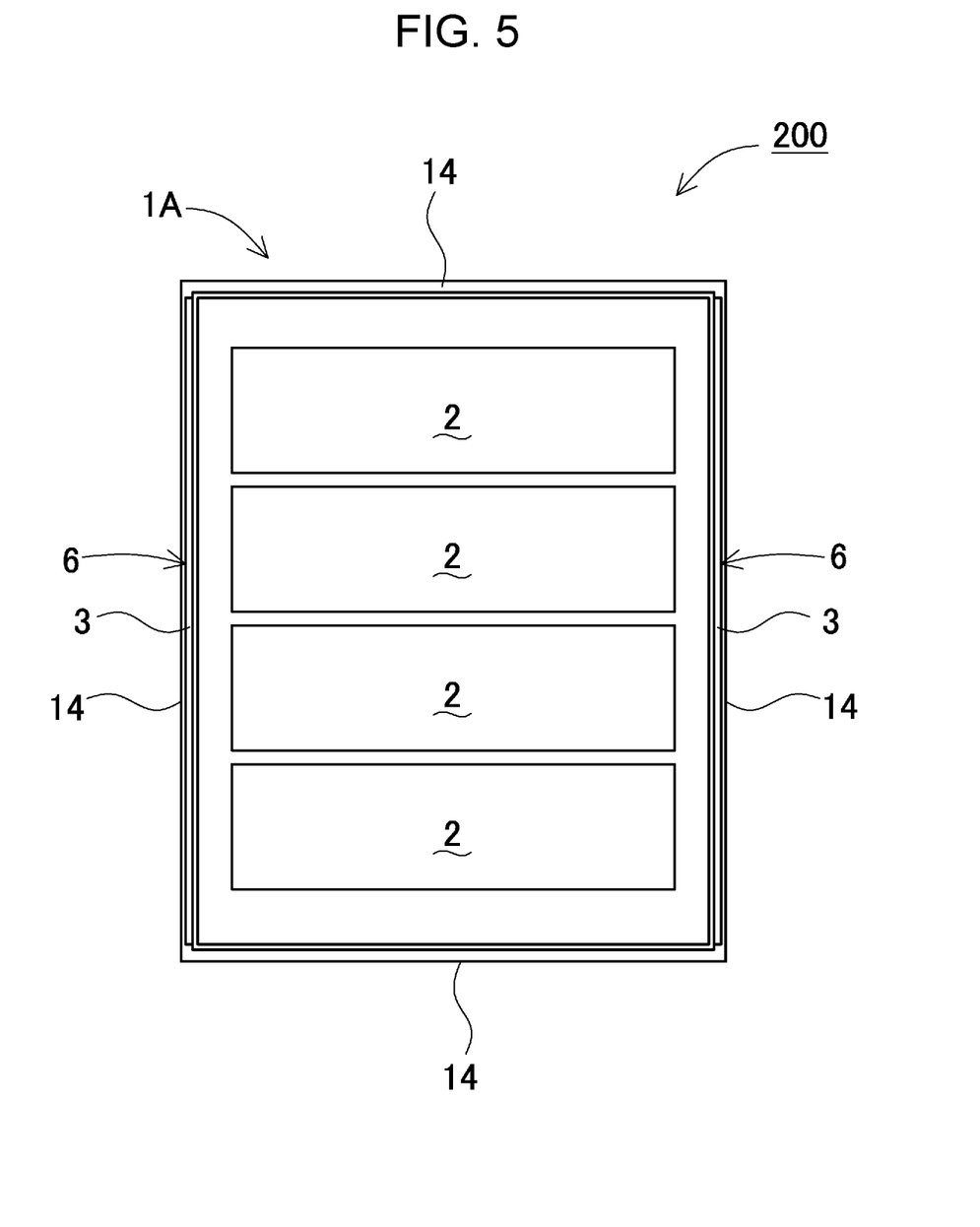
FIG. 5 is a plan view of a battery pack with an upper case removed according to a second exemplary embodiment of the present invention.

This structure enables flame at high temperature or the like to be effectively prevented from being vigorously ejected to the outside of the case while heat-resistant material 3 is disposed only inside mating surface 4 of peripheral wall 14 disposed in a direction in which exhaust gas at high temperature is ejected from battery cell 2. The heat-resistant material disposed on the peripheral walls facing both respective end surfaces of the cylindrical battery may have a shape in which both end portions are bent having a U-shape turned sideways in plan view.

(Heat-Resistant Material 3)

Heat-resistant material 3 is formed in a sheet shape or a plate shape as a whole, and is disposed between mating surfaces 4 facing each other of case unit 10. Heat-resistant material 3 is disposed blocking gap 5 between mating surfaces 4 of case unit 10, and prevents exhaust gas at high temperature, flame, and the like ejected from battery cell 2 from passing through mating surfaces 4 and being vigorously ejected to the outside of case 1. Heat-resistant material 3 illustrated in FIG. 2 has a rectangular shape in plan view and a ring shape having a predetermined height to be able to be disposed facing four sides of case unit 10 having a rectangular shape in plan view. As described above, heat-resistant material 3 having this shape can be simply and easily disposed at a fixed position along the outer peripheral surface of first vertical wall 16A provided in lower case 1A.

Heat-resistant material 3 is made of a material having flame retardancy and flame-resistance. As heat-resistant material 3, for example, a material in which heat-resistant fibers having flame retardancy are aggregated into a sheet shape or a plate shape, or a material in which heat-resistant fibers are woven into a sheet shape can be used. As such a heat-resistant fiber, an inorganic fiber obtained by molding silica or mica into a fibrous shape is preferably used. As the heat-resistant fiber, a glass fiber, a carbon fiber, an aramid fiber, and the like can also be used. A structure in which a heat-resistant material is composed of an aggregate sheet obtained by forming heat-resistant fibers into a sheet shape enables exhaust gas at high temperature and flame to be effectively suppressed while the entire heat-resistant material is thinned by forming the heat-resistant material into a sheet shape. The heat-resistant material formed by aggregating the heat-resistant fibers in a plate shape can more effectively suppress exhaust gas at high temperature and flame when being thickly molded as a whole.

The heat-resistant material composed of an aggregate sheet of the heat-resistant fibers enables a surface of aggregate sheet 3a to be covered with plastic 3b as illustrated in the partially enlarged sectional view of FIG. 4. This heat-resistant material 3 can be simply and easily formed into a predetermined shape as a whole, as molded heat-resistant sheet 3A formed by coupling molded plastic 3b and aggregate sheet 3a in an integrated structure. In particular, aggregate sheet 3a made of inorganic fiber can achieve excellent shape retainability when having a surface coated with plastic 3b, and thus enables achieving an advantage of enabling a smooth assembly process of the battery pack and efficient mass production of the battery pack.

As illustrated in FIG. 4, molded heat-resistant sheet 3A enables plastics 3b to be coupled to both respective surfaces of aggregate sheet 3a in an integrated structure. Molded heat-resistant sheet 3A can achieve excellent processing characteristics and excellent formation retention when having aggregate sheet 3a with both surfaces covered with respective plastics 3b. The molded heat-resistant sheet may have not only an aggregate sheet with only one surface covered with plastic, but also an aggregate sheet that is entirely impregnated with a resin. A heat-resistant material formed by aggregating heat-resistant fibers also may have a surface covered with plastic.

(Circuit Board 9)

Battery pack 100 illustrated in FIGS. 1 to 3 includes circuit board 9 that is electrically coupled to battery cell 2 and is also housed in case 1. Circuit board 9 is disposed along side surfaces of the cylindrical batteries arranged parallel to each other, and in the drawing, is disposed parallel to the multiple cylindrical batteries disposed parallel to each other in the same plane shape. Circuit board 3 is equipped with an electronic component (not illustrated) that constitutes a charge and discharge circuit of battery cell 2, and a battery protection circuit.

Second Exemplary Embodiment

Figure 6:
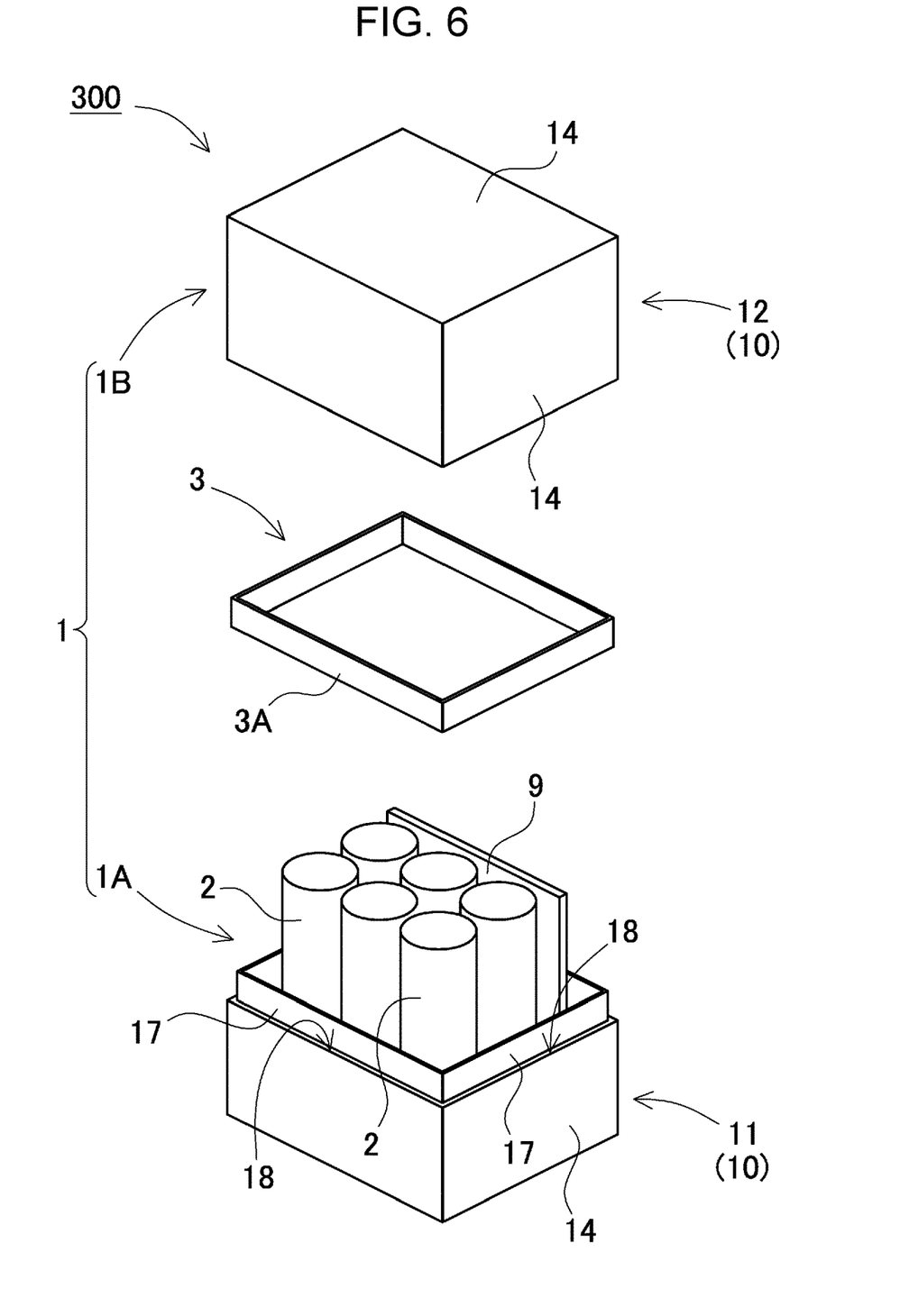
FIG. 6 is an exploded perspective view of a battery pack according to a third exemplary embodiment of the present invention.
Figure 7:
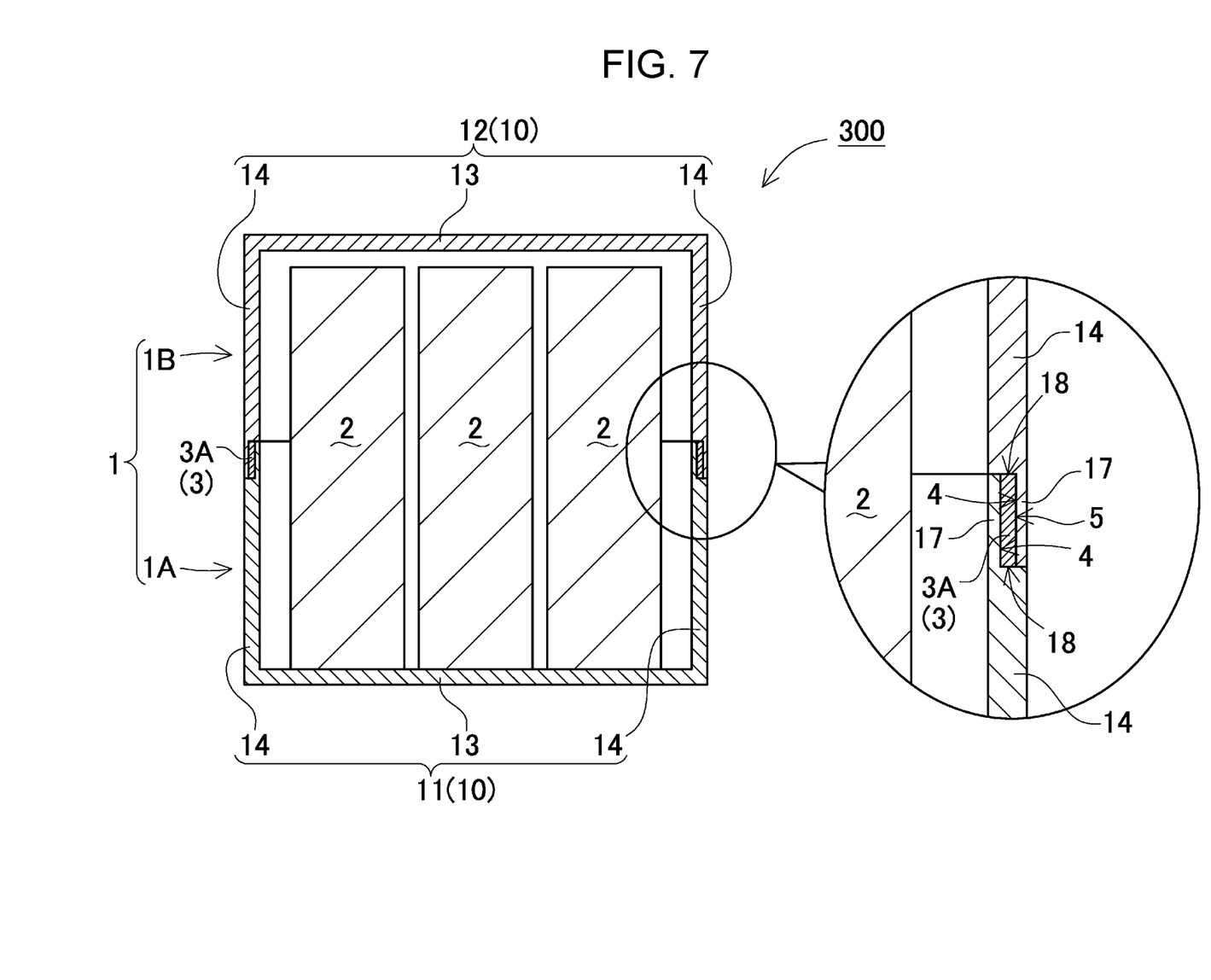
FIG. 7 is a partially enlarged vertical sectional view of a battery pack according to the third exemplary embodiment of the present invention.
Figure 8:
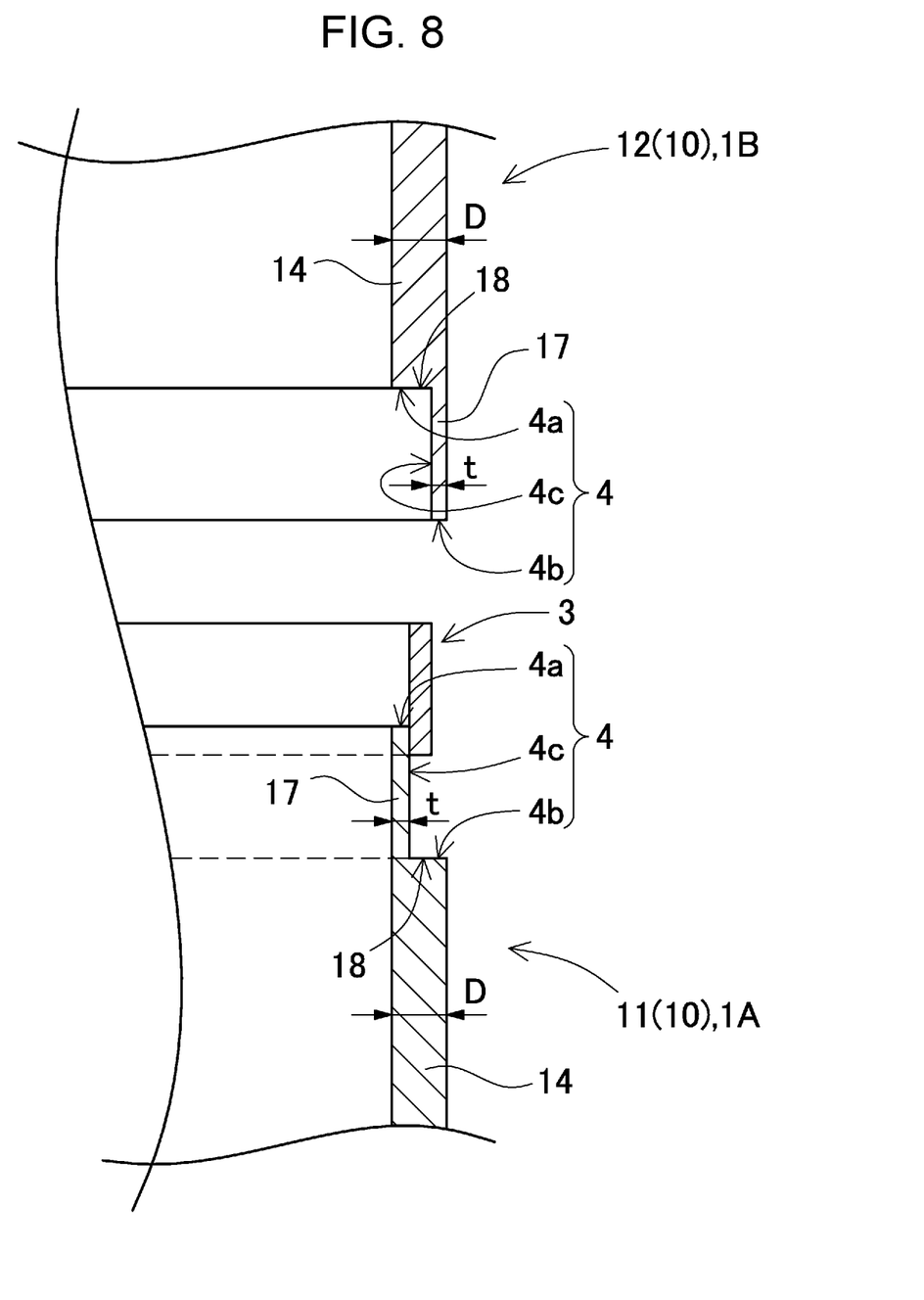
FIG. 8 is an enlarged exploded sectional view of a main part of the battery pack illustrated in FIG. 7.

FIGS. 6 to 8 each illustrate battery pack 300 according to a second exemplary embodiment of the present invention. Battery pack 300 illustrated in these drawings is different from battery pack 100 shown in the first exemplary embodiment described above in an arrangement direction of multiple battery cells 2 housed in case 1. Thus, lower case 1A being first case unit 11 and upper case 1B being second case unit 12 are different from each other in shape, specifically, in shape and size of surface plate 13 and in shape and height of peripheral wall 14 formed along an outer periphery of surface plate 13.

Battery pack 300 illustrated in FIG. 6 houses multiple battery cells 2 in case 1, multiple battery cells 2 being vertically parallel to each other with a vertical axial direction. Battery pack 300 of FIG. 6 includes six cylindrical batteries that are disposed in two rows and three columns, and circuit board 9 that is vertically disposed parallel to the cylindrical batteries disposed in the three columns. Battery pack 300 houses battery cells 2 in case 1 in an attitude described above, and battery cells 2 each provided with exhaust valve 2a are disposed with an opening of exhaust valve 2a facing vertically. Thus, case unit 10 is divided into upper and lower parts that are coupled to each other between mating surfaces 4 provided in a vertically intermediate portion of a side surface of case 1. This case causes a state where exhaust gas at high temperature, flame, and the like ejected from battery cell 2 disposed vertically pass through an inner surface of peripheral wall 14 from an inner surface of surface plate 13 of each of the upper and lower parts of case unit 10, and then are discharged to the outside of case 1 through mating surfaces 4 being a coupled portion between first case unit 11 and second case unit 12. Thus, battery pack 300 includes heat-resistant material 3 disposed along four sides of case 1 having a quadrangular shape in plan view.

Battery pack 300 according to the second exemplary embodiment illustrated in FIGS. 7 and 8 includes case 1 that is configured such that upper and lower parts of case unit 10 have peripheral walls 14 with leading end portions that are each formed in a stepped shape and that are allowed to be fitted to each other to form gap 5 in a hollow shape between mating surfaces 4 while mating surfaces 4 facing each other of the respective upper and lower parts of case unit 10 are coupled to each other. Case units 10 illustrated in FIGS. 7 and 8 have respective stepped shapes that are allowed to be fitted to each other by providing fitting ridge 17 and fitting recess 18 on a front or a back of each case unit 10. Each case unit 10 includes fitting protrusion 17 that protrudes from a leading end surface of peripheral wall 14 and is provided along an opening edge of peripheral wall 14.

Specifically, as illustrated in FIGS. 6 to 8, first case unit 11 has a stepped shape in which fitting protrusion 17 is formed on the leading end surface of peripheral wall 14 on an inner peripheral surface side, and fitting recess 18 is provided on an outer peripheral surface side of the fitting protrusion, i.e., an outer peripheral surface side of the leading end surface. Second case unit 12 has a stepped shape in which the fitting protrusion is formed on the leading end surface of peripheral wall 14 on the outer peripheral surface side, and fitting recess 18 is provided on an inner peripheral surface side of the fitting protrusion, i.e., an inner peripheral surface side of the leading end surface. First case unit 11 and second case unit 12 are configured to have respective fitting protrusions 17 equal in height, and to have respective peripheral walls 14 with leading end surfaces that are coupled to each other by allowing fitting protrusions 17 and corresponding fitting recesses 18 to be fitted to each other, fitting protrusions 17 and fitting recesses 18 being disposed inversely on an inner side and an outer side of peripheral wall 14, and facing each other.

First case unit 11 and second case unit 12 have respective peripheral walls 14 equal in thickness D, and respective fitting protrusions 17 each having thickness t smaller than ½ of thickness D of each peripheral wall 14, thereby forming gap 5 for disposing heat-resistant material 3 between fitting protrusions 17 facing each other. This structure allows heat-resistant material 3 to be sandwiched between fitting protrusions 17 of the pair of case units 10 coupled with mating surfaces 4.

As illustrated in FIG. 8, case 1 described above is configured such that heat-resistant material 3 formed in a frame shape is disposed along an outer peripheral surface of fitting protrusion 17 of first case unit 11 being lower case 1A, and fitting protrusion 17 of second case unit 12 is disposed along an outer peripheral surface of heat-resistant material 3, thereby disposing heat-resistant material 3 between mating surfaces 4 facing each other. In this state, lower case 1A being first case unit 11 and upper case 1B being second case unit 12 are coupled by ultrasonic welding with mating surfaces 4 that are in close contact with each other. As illustrated in FIG. 8, first case unit 11 and second case unit 12 are ultrasonically welded while a leading end surface of fitting protrusion 17 of first case unit 11 and a stepped surface of fitting recess 18 of second case unit 12 are brought into close contact with each other as first mating surface 4a, and a leading end surface of fitting protrusion 17 of second case unit 12 and a stepped surface of fitting recess 18 of first case unit 11 are brought into close contact with each other as second mating surface 4b. In this state, heat-resistant material 3 disposed inside mating surfaces 4 is sandwiched between third mating surfaces 4c that are facing surfaces of respective fitting protrusions 17 facing each other, and then gap 5 is blocked.

The above structure enables heat-resistant material 3 to be disposed inside mating surfaces 4 coupled to each other while mating surfaces 4 formed at leading end portions of respective peripheral walls 14 are simplified in shape.

Third Exemplary Embodiment

Figure 9:
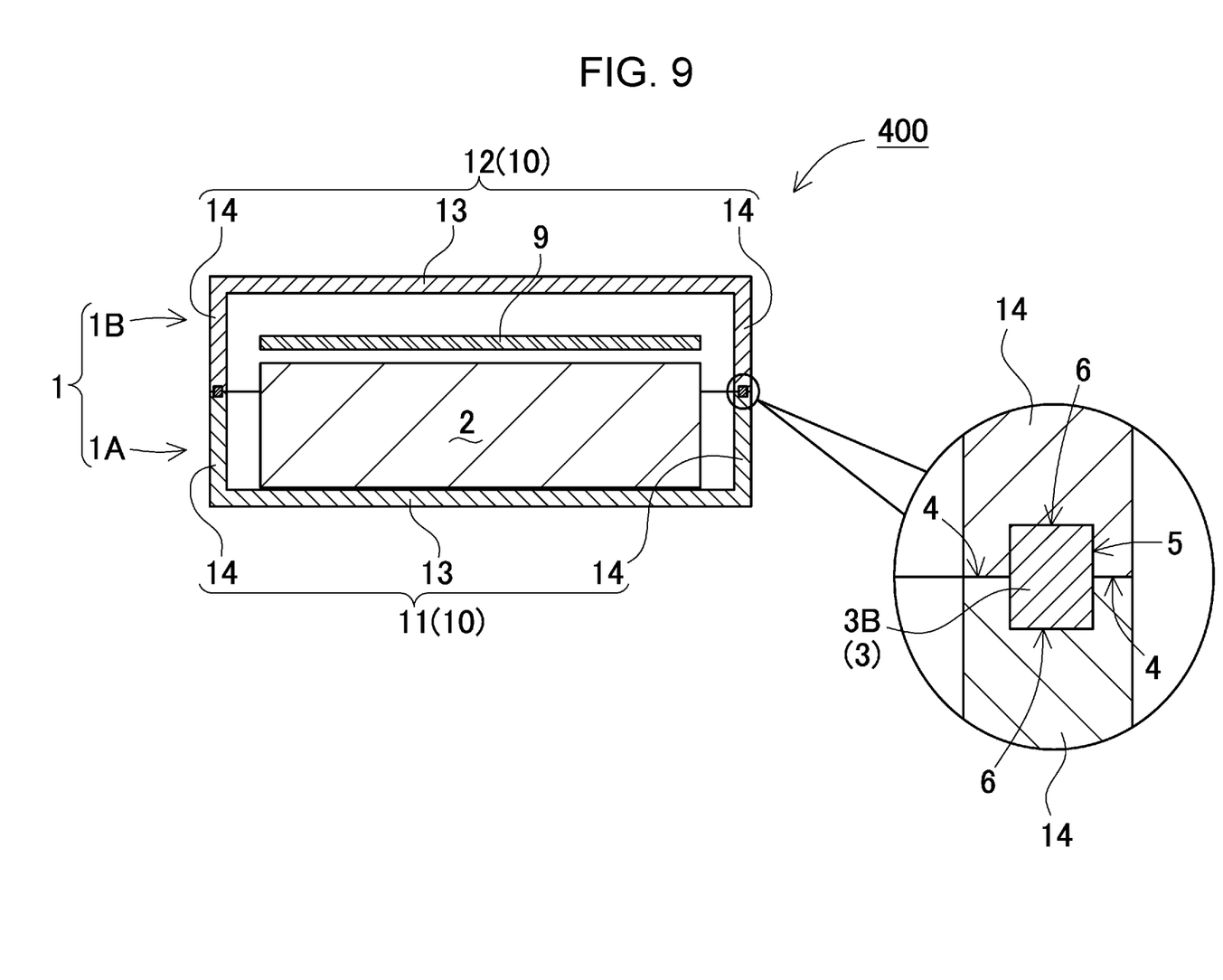
FIG. 9 is a partially enlarged vertical sectional view of a battery pack according to a fourth exemplary embodiment of the present invention.

FIG. 9 illustrates battery pack 400 according to a third exemplary embodiment of the present invention. Battery pack 400 illustrated in this drawing includes heat-resistant material 3B different in structure from the heat-resistant material in a sheet shape formed of heat-resistant fiber described above. Heat-resistant material 3B illustrated in the drawing is a structure in a plate shape or a rod shape formed of an inorganic substance, and is a molded body of mica or ceramic, or a hard material obtained by sintering or pressure molding various inorganic substances. Heat-resistant material 3B illustrated in the drawing has a rod shape having a cross-sectional shape in the shape of a quadrangle, and is disposed at a fixed position by being fitted in coupling grooves 6 formed along leading end surfaces of peripheral walls 14 of respective case units 10. Upper and lower case units 10 illustrated in the drawing are provided with coupling grooves 6 in central portions of respective mating surfaces 4 facing each other, and are coupled at a fixed position while mating surfaces 4 are positioned using heat-resistant material 3B fitted in coupling grooves 6. Lower case 1A being first case unit 11 and upper case 1B being second case unit 12 are coupled by ultrasonic welding while mating surfaces 4 facing each other are in close contact with each other. In this state, heat-resistant material 3B is disposed inside mating surfaces 4 coupled to each other, and then gap 5 between mating surfaces 4 is blocked.

Although battery packs 100, 200, 300, 400 described in the above exemplary embodiments each include case 1 composed of first case unit 11 and second case unit 12 that are case units 10 divided into upper and lower parts, the case may be composed of three or more case units. For example, a case composed of three case units can include a first case unit being a lower case, a second case unit being an upper case, and a third case unit being an intermediate case stacked between the lower case and the upper case. Even a case composed of three case units is configured such that the case units are coupled to each other with mating surfaces facing each other of the corresponding case units stacked on each other, and a heat-resistant material is disposed inside the mating surfaces.

INDUSTRIAL APPLICABILITY

The present invention is a battery pack in which a battery cell is housed in a case, and particularly, the battery pack is capable of effectively preventing adverse effect due to exhaust gas at high temperature, flame, and the like ejected from an exhaust valve of the battery cell in an abnormal case of the battery cell, and thus can be suitably used as a power source for an electric tool, an electric assist bicycle, an electric motorcycle, an electric tricycle, an electric cart, a cleaner, and the like, and further as a power storage at home, a store, and the like.

REFERENCE MARKS IN THE DRAWINGS 100,200,300,400: battery pack
1: case
1A: lower case
1B: upper case
2: battery cell
2a: exhaust valve
3: heat-resistant material
3A: molded heat-resistant sheet
3a: aggregate sheet
3b: plastic
3B: heat-resistant material
4: mating surface
4a: first mating surface 4b: second mating surface
4c: third mating surface
5: gap
6: coupling groove
9: circuit board
10: case unit
11: first case unit
12: second case unit
13: surface plate
14: peripheral wall
16: vertical wall
16A,16C: first vertical wall
16B,16D: second vertical wall
17: fitting protrusion
18: fitting recess

The invention claimed is:

1. A battery pack comprising:
a battery cell having an exhaust valve that opens when internal pressure of the battery cell exceeds set pressure;
a case that houses the battery cell,
the case including multiple case units each molded with plastic,
the multiple case units being coupled to each other at mating surfaces of the multiple case units to dispose the battery cell inside the case; and
a heat-resistant material disposed inside the mating surfaces, the heat-resistant material blocking a gap between the mating surfaces.

2. The battery pack according to claim 1, wherein the heat-resistant material is sandwiched between the mating surfaces to block the gap between the mating surfaces.

3. The battery pack according to claim 1, wherein,
each of the mating surfaces is provided with a coupling groove, and
the heat-resistant material is guided to the coupling groove to block the gap between the mating surfaces.

4. The battery pack according to claim 1, wherein
the multiple case units include stepped shapes in which the mating surfaces of the multiple case units can be fitted to each other, the stepped shapes each being provided fitting ridges or fitting recesses on either of front or rear surfaces of a corresponding one of the multiple case units, and
the heat-resistant material is sandwiched between the fitting protrusions of the mating surfaces of the multiple case units coupled to each other as a pair.

5. The battery pack according to claim 1, wherein the heat-resistant material is disposed at a position facing an opening of the exhaust valve.

6. The battery pack according to claim 1, wherein the heat-resistant material is an aggregate sheet of heat-resistant fiber.

7. The battery pack according to claim 6, wherein the heat-resistant fiber is inorganic fiber.

8. The battery pack according to claim 6, wherein the heat-resistant material is a molded heat-resistant sheet in which a molded plastic and the aggregate sheet are coupled forming an integrated structure.

9. The battery pack according to claim 8, wherein the heat-resistant material is the molded heat-resistant sheet in which plastics are coupled to both surfaces of the aggregate sheet, forming an integrated structure.

10. The battery pack according to claim 8, wherein the heat-resistant material is the molded heat-resistant sheet molded into a shape disposed between the mating surfaces of the multiple case units.

* * * * *